May 8, 1923. 1,454,724
G. W. CAREY
CRUST BREAKING ATTACHMENT FOR BEET CULTIVATORS
Filed Sept. 28, 1922
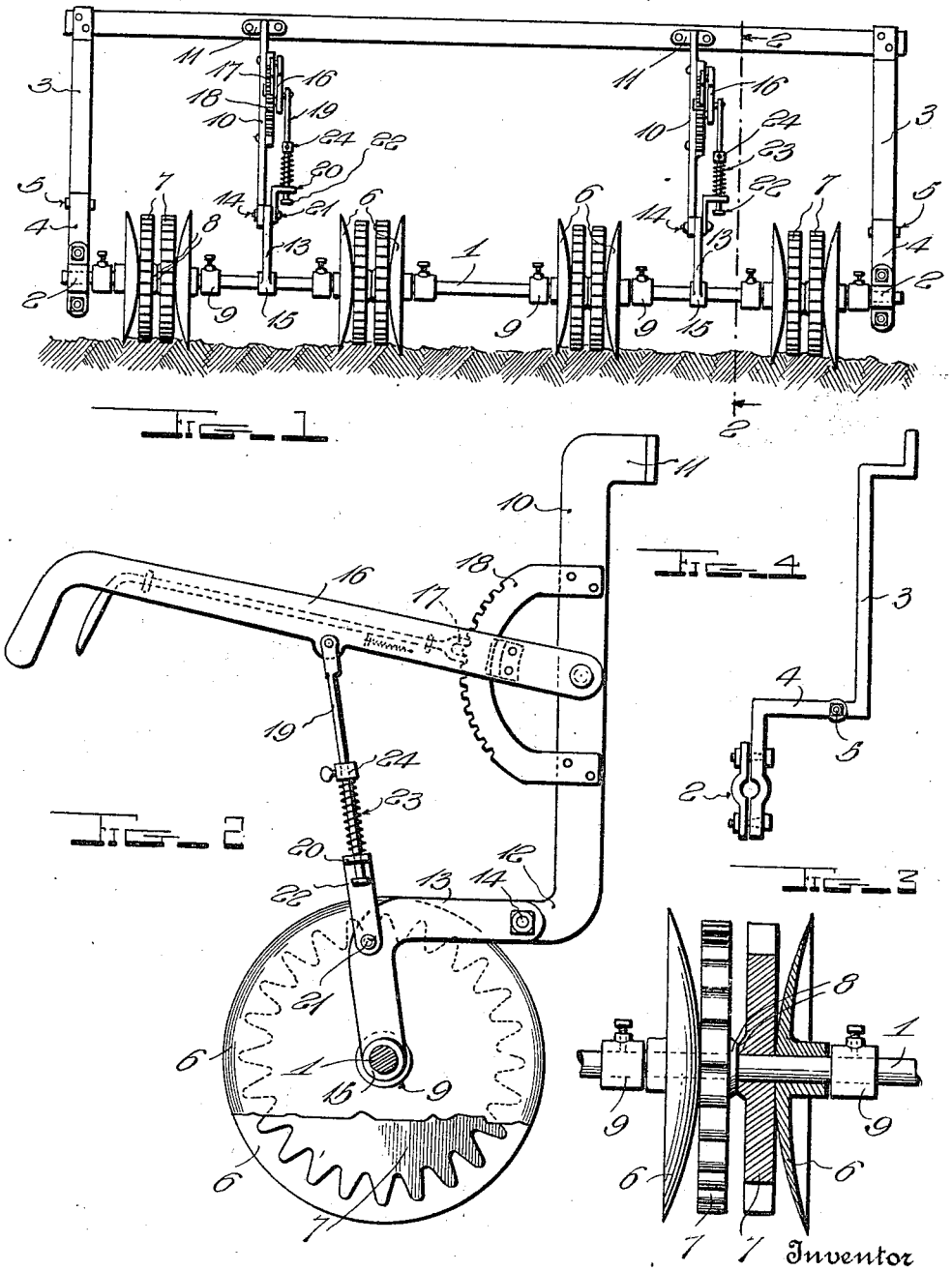
George W. Carey Patented May 8, 1923.

1,454,724

UNITED STATES PATENT OFFICE.

GEORGE W. CAREY, OF OSHKOSH, NEBRASKA.

CRUST-BREAKING ATTACHMENT FOR BEET CULTIVATORS.

Application filed September 23, 1922. Serial No. 591,128.

*To all whom it may concern:*

Be it known that I, GEORGE W. CAREY, a citizen of the United States, residing at Oshkosh, in the county of Garden and State of Nebraska, have invented certain new and useful Improvements in Crust-Breaking Attachments for Beet Cultivators; and I do declare the following to be a full, clear, and exact description of the invention, such as will enable others skilled in the art to which it appertains to make and use the same.

My invention relates to attachments for cultivators, such as those used for cultivating rows of sugar beets. Cultivators of this character, while they effectively cultivate the earth between the rows, often leave a thick crust of sun-baked earth directly along the row, which is practically impenetrable to the sprouted plants beneath, thereby often causing an entire crop to be smothered. It is the object of my invention however to provide a novel form of attachment for cultivators which will effectively work the earth directly along both sides of the rows and will pulverize the earth over the sprouting plants, without injuring the latter in any manner, permitting them to readily break through the surface.

With the foregoing in view, the invention resides in the novel subject matter hereinafter described and claimed, the description being supplemented by the accompanying drawing.

Figure 1 is a rear elevation of an attachment constructed in accordance with my invention.

Figure 2 is a vertical sectional view as indicated by line 2—2 of Fig. 1.

Figure 3 is an enlarged vertical section, partly in elevation, of one group of the earth-working disks and toothed wheels.

Figure 4 is a side elevation of one of the end standards which carry the disk-carrying shaft.

In the drawings above briefly described, the numeral 1 designates a non-rotatable horizontal shaft whose ends are secured in appropriate bearings 2 on the lower ends of a pair of standards 3 whose upper ends are adapted for connection to the frame of a cultivator, by means of bolts or other suitable fasteners. The lower end of each standard 3 is rearwardly offset as indicated at 4 and pivoted upon a horizontal axis 5 for permitting the shaft 1 to raise and lower.

Spaced apart on the shaft 1, are a number of pairs of concavo-convex disks 6, the convex sides of each pair of disks being disposed inwardly towards each other in spaced relation. A pair of peripherally toothed wheels 7 are mounted on the shaft 1 between each pair of disks 6, the outer sides of said wheels being in contact with the disks, while the inner sides of said wheels are spaced slightly apart by means of short hubs 8 with which they are provided. The disks 6 and wheels 7 are free to rotate upon the shaft 1 independently of each other and outward movement of said disks on the shaft is prevented by collars 9 secured upon said shaft in any suitable manner.

As the cultivator is drawn along, the disks 6 work the earth along opposite sides of the several rows of sprouted plants and the toothed wheels 7 effectively break the crust directly over the rows, so that said plants may readily break through the surface and hence there is no danger of smothering. In view of the fact that the several disks and wheels are free to rotate independently of each other, interruption of the rotation of any of these parts, for instance by encountering a stone or the like, will not interfere with the other parts and consequently there is very little danger of dragging the wheels 7 along the rows of plants and probably injuring the latter.

The numerals 10 designate a pair of standards spaced inwardly from the end standards 3, the upper ends of said standards 10 being directed forwardly as shown at 11 for attachment to the cultivator frame, while the lower ends of said standards are rearwardly extended as at 12. A pair of L-shaped arms 13 are pivoted at 14 to the standard ends 12, the lower ends of said arms 13 being provided with suitable bearings 15 receiving the shaft 1. Hand-levers 16 are fulcrumed to the standards 10 and extend rearwardly therefrom, being provided with suitable dogs 17 and racks 18 for holding them in adjusted position. Rods 19 are pivoted to and extend downwardly from the levers 16, the lower ends of said rods being passed slidably through the horizontal arms of a pair of inverted L-shaped links 20 which at 21 are pivoted to the arms 13. The lower ends of the rods 19 are provided with heads 22 adapted to strike the links 20 when the levers 15 are swung upwardly whereby to raise the arms 22 and the shaft 1, it being understood that the pivots of the end standards 3 are in alinement with the pivots 14 of said arms, to permit swinging of the latter. When the shaft 1 is lowered so that the disks 6 engage the ground, these disks and the wheels 18 are held yieldably down by coiled springs 23 which bear against the upper ends of links 20 and react against the collars 24 secured on the rods 19.

By employing the construction shown or a substantial equivalent thereof, it will be seen that a comparatively simple and inexpensive, yet a highly efficient and desirable machine has been provided. It will be understood however that the present disclosure is for illustrative purposes only and that within the scope of the invention as claimed, numerous minor changes may be made.

I claim:

1. A crust breaking attachment for cultivators comprising a shaft and means for connecting it with the cultivator, a pair of spaced concavo-convex disks on said shaft with their convex sides disposed adjacent each other in spaced relation, said disks being intended to straddle a row of sprouting plants, and a pair of slightly spaced toothed wheels on said shaft between said disks to break the surface of the ground over the sprouts.

2. A structure as specified in claim 1, said disks and wheels being freely rotatable independently of each other.

3. A crust breaking attachment for cultivators comprising a shaft and means for connecting it with the cultivator, a pair of spaced concavo-convex disks rotatable on said shaft, shoulders on the shaft holding said disks against outward movement, and a pair of toothed wheels rotatable on the shaft between and in contact with said disks, said wheels having contacting hubs spacing them apart, said disks and wheels being freely rotatable independently of each other.

4. An earth cultivating machine comprising a pair of axially alined concavo-convex disks having their convex sides disposed adjacent each other, and a toothed wheel between said disks adapted to travel over a row of sprouts straddled by said disks.

In testimony whereof I have hereunto affixed my signature.

GEORGE W. CAREY.